United States Patent
Aleksoff

[11] 3,817,597
[45] June 18, 1974

[54] LASER SCANNER USING AN INTRACAVITY DEVICE OF A FERROELASTIC MATERIAL TO FORM AN IMAGE

[75] Inventor: Carl C. Aleksoff, Ann Arbor, Mich.

[73] Assignee: E. I. du Pont de Nemours and Company, Wilmington, Del.

[22] Filed: Apr. 18, 1973

[21] Appl. No.: 352,472

[52] U.S. Cl. ............. 350/150, 350/149, 350/160, 350/161, 350/285, 331/94.5
[51] Int. Cl. ............................................. G02f 1/26
[58] Field of Search .......... 350/149, 150, 160, 161, 350/285; 331/94.5

[56] References Cited
UNITED STATES PATENTS
3,732,549  5/1973  Barkely ................................ 350/150

*Primary Examiner*—Ronald L. Wibert
*Assistant Examiner*—Michael J. Tokar

[57] ABSTRACT

A laser is provided with an intracavity device consisting of a crystal of a material having ferroelastic properties with a single movable domain wall. Light is deflected from the axis of the cavity by the crystal in the region of the domain wall and imaged to an image which can be moved by moving the domain wall.

7 Claims, 11 Drawing Figures

LASER SCANNER USING AN INTRACAVITY DEVICE OF A FERROELASTIC MATERIAL TO FORM AN IMAGE

BACKGROUND OF THE INVENTION

This invention relates to optical scanners. More particularly the invention relates to lasers with an intracavity device of a material with ferroelastic properties from which a scanning image is extracted.

A crystal is said to be ferroelectric if it exhibits a spontaneous switchable electric dipole moment. In the absence of an externally applied electric field, the electric polarization, corresponding to the dipole moment, can have two or more orientations and can be shifted from one orientation, or state, to another by the external application of an electric field.

By analogy, a crystal is said to be ferroelastic if it exhibits a spontaneous switchable mechanical strain. In the absence of an externally applied mechanical stress, the mechanical strain can have two or more configurations, and can be shifted from one configuration to another by external application of a mechanical stress. In a limited class of materials, the two effects, ferroelectricity and ferroelasticity, are coupled so that the two or more stable states of the crystal are possible, each characterized by a definite orientation of electric polarization and a definite mechanical strain configuration.

The terms "ferroelectric" and "ferroelastic" arise by analogy with ferromagnetism. Like ferromagnetic materials, ferroelectric crystals exhibit a hysteresis loop, except that the loop occurs on a plot of electric polarization versus electric field, and display a transition temperature, $T_c$, analogous to the ferromagnetic Curie temperature, above which the spontaneous dipole moment, and indeed ferroelectric behavior, disappear. Likewise, ferroelastic materials display a hysteresis loop on a plot of mechanical stress versus mechanical strain, and a transition temperature. When ferroelectricity and ferroelasticity are coupled in a single material, a hysteresis loop is displayed on a plot of electric polarization and associated mechanical strain versus electric field and associated mechanical stress, and both spontaneous polarization and spontaneous strain disappear at the same critical temperature. Such a material can be switched among states, each characterized by a specific electric polarization and mechanical strain, by external application of either an electric field or a mechanical stress, or both.

The region, within a single ferroelectric crystal, in which the spontaneous polarization vector is everywhere oriented in the same direction, is called a domain. There is, generally, more than one domain within a crystal, and the interface between domains is called a domain wall. Application of an electric field having a component in an allowed direction of polarization can cause nucleation of and/or growth of ferroelectric domains having that particular polarization direction, with consequent formation and movement of the associated domain walls. The analogous situation exists in ferroelastic materials, where the domain wall is effectively a twin boundary. In coupled ferroelectric/ferroelastic materials, each ferroelectric domain is associated and coextensive with a ferroelastic domain, and the size and location of a particular domain (and thus the position and motion of a domain wall) can be controlled by either electrical or mechanical means, or by both means simultaneously.

The existence of ferroelasticity and ferroelectricity can be ascertained from the point symmetry of the crystal below and above the transition temperature which is the Curie temperature, as shown by Aizu, J. Phys. Soc. Japan 27, 387 (1969). The possible types can be classified using the convenient notation of Aizu wherein the point group of the high temperature prototype paraelectric and/or paraelastic phase, is first written followed by F and the point group of the ferroelastic and/or ferroelectric phase. The possible domain walls in such materials can be ascertained by the use of group theory, following the method which Shuvalov [J. Phys. Soc. Japan 28 Supplement 39 (1970)] has developed for ferroelectric materials.

The domain walls which interface adjacent domains tend to be highly planar and generally extend completely across the crystal in crystalline materials which have ferroelastic properties. The domain walls differ in optical properties from either adjacent domain and in particular if collimated light is passed through a crystal of a ferroelastic material containing a domain wall, the light emerging from the region of the domain wall diverges, and can be isolated by spatial filtering techniques.

When a ferroelastic crystal containing a domain wall extending across the crystal is switched from one strain state to the state of the adjacent domain interfaced by the wall, the switching is accomplished by lateral motion of the domain wall. Thus, by providing switching means together with spatial filtering, a line image of the domain wall can be scanned in a controlled manner to form a useful line scanner as shown in U.S. Pat. No. 3,704,937.

The above method of obtaining a scanning image is not highly efficient since only the light traversing the region of the domain wall is utilized. It would be desirable to obtain higher intensity scannable images for use in many applications.

SUMMARY OF THE INVENTION

The present invention is directed to an intracavity laser scanner comprising an optical cavity defined by a first mirror and a second mirror with a lasing material in the cavity. A single transparent crystal of a material having ferroelectric properties divided into domains by at least one domain wall is dispersed in the cavity so that the plane of the domain wall is substantially parallel with the pattern of the light in the cavity whereby light passing solely through the domains is essentially undeflected in optical path, while light passing the domain wall is deflected from the optical path in the cavity. Means are provided to image the light deflected from the optical path of the cavity, and means are provided to move the domain walls in the crystal to scan the image of the deflected light.

THE DRAWINGS AND DETAILED DESCRIPTION OF THE INVENTION

This invention will be better understood by reference to the drawings which accompany this specification, of which:

FIG. 9b is a side view of the device of FIG. 9a;

Figure 1:
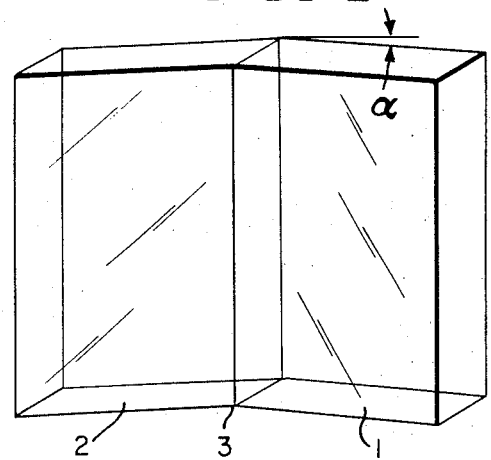
FIG. 1 shows a plate of a crystal of a material with ferroelastic properties divided into two domains by a domain wall.

Turning now to the drawings, in FIG. 1 there is illustrated a crystal plate of a material having ferroelastic properties. The crystal is divided into two domains, 1 and 2, by a domain wall, 3. The spontaneous strain associated with the ferroelasticity is manifested by a "bend" in the crystal at the domain wall, indicated by the angle $\alpha$ in the FIG. 1. A further bending in the plane of the plate can also occur with some materials.

A well-known class of materials having coupled ferroelectric-ferroelastic properties are the rare earth molybdates having the $\beta'$-gadolinium molybdate structure which is typified by $\beta'$-gadolinium molybdate itself. Below the Curie temperature of 159°C, $\beta'$-gadolinium molybdate is orthorhombic with symmetry $\overline{4}2m$. Above 159° the paraelectric-paraelastic phase is tetragonal with symmetry mm2. The material is thus classified as a $\overline{4}2mFmm2$ species in the Aizu notation. The ferroelectric axis is the c axis and plates can be readily cut perpendicular thereto. Domain walls form on the two mutually perpendicular planes of the {110} set. The a and b axes interchange on crossing a domain wall, and accordingly a small angle of deformation takes place at the wall of about 0.28° corresponding to the angle $\alpha$ of FIG. 1. The domain walls are highly planar and move laterally either on applying shear stress along the [110] direction parallel to the selected wall or by the application of an electric field to electrodes applied to the opposing (001) faces of the plate.

Figure 2:
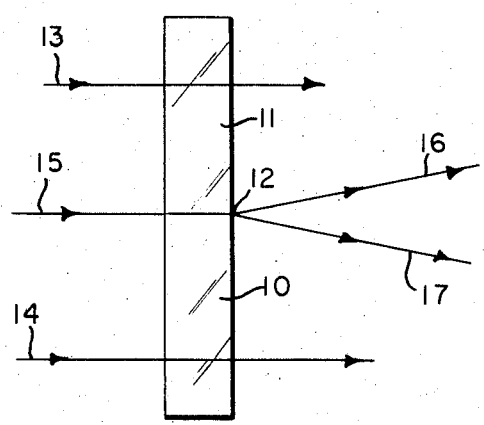
FIG. 2 is a diagram showing the effect of the crystal of FIG. 1 on collimated light directed through the plate of FIG. 1.

The domains of gadolinium molybdate are biaxially birefringent (+)2V = 11° and $\Delta n = 4 \times 10^{-4}$ with $n$ measured along the c axis of 1.90, and transparent to visible light. The optical properties of the domain wall, however, differ from those of each of the adjacent domains as illustrated in FIG. 2. In FIG. 2, a plate of a material having ferroelastic properties such as gadolinium molybdate is shown divided into two domains 10, 11 by a domain wall 12. Collimated light such as rays 13 and 14 pass through the plate undeflected, although if the light is polarized the polarization will be modified by the birefringence of domains 10 and 11. Light passing the region of the domain wall 12 such as ray 15 behaves differently: (1) the plane of polarization is not modified, and (2) the emerging light diverges as indicated by rays 16 and 17. The reason for this is not fully understood, but is believed to be due in part to diffraction and in part due to the variation in refraction index across the wall. For convenience, the phenomenon will be called hereafter scattering by the domain wall.

Figure 3:
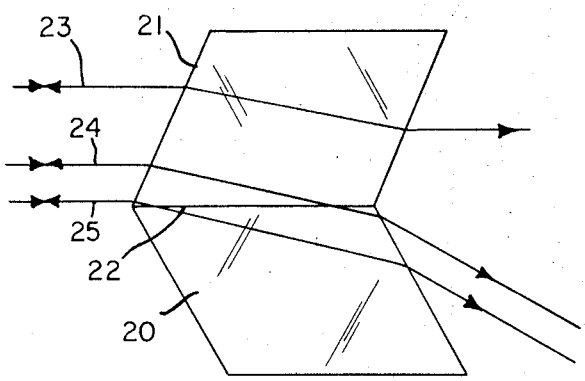
FIG. 3 is a diagram to illustrate the deflection of light traversing a domain wall when incident on a bent surface of the crystal of FIG. 1.

The spontaneous strain of crystals of materials having ferroelastic properties can be employed to deflect light passing through a plate thereof by geometric optics as illustrated in FIG. 3. In FIG. 3 a plate of gadolinium molybdate such as that of FIG. 1 is shown except that the angle $\alpha$ of the bend is greatly exaggerated to illustrate the optical effect more clearly. Rays of light parallel to domain wall 22 such as ray 23 passing solely through domain 21 are deflected by the crystal but emerge parallel to the direction of incidence but displaced towards the axis of the system. Rays passing solely through domain 20 are likewise displaced towards the axis of the system but are unchanged in direction. By contrast rays such as ray 24 and ray 25, which are incident on domain 21 and pass through the domain wall, emerge from domain 20 at an angle from the axial direction. It will be evident that the width of the image will be proportional to the thickness of the crystal traversed by the ray. If the deflection is purely geometric, the apparent source width is $$W = \alpha t(N-1)/N$$

wherein $\alpha$ is the angle of "bend" defined above, t is the length of the crystal traversed by the rays and $N$ is the refraction index of the ferroelastic material. Diffraction and birefringence modify the essentially simple geometric analysis given hereinabove, but for convenience this method of obtaining deflection from the axial direction will be called geometric deflection.

Figure 4:
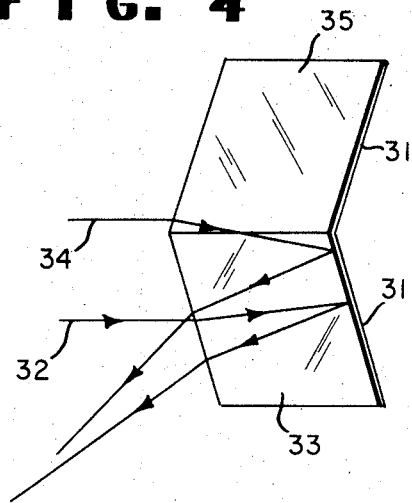
FIG. 4 illustrates the deflection of light passing through a domain and through the domain wall when the crystal of FIG. 3 is equipped with reflecting surfaces on its concave side.

Modifications of the above methods of deflecting a light beam in the vicinity of a domain wall include employing the crystal as one mirror of the laser cavity by coating one of the faces with a metallic reflection coating. FIG. 4 illustrates such a coating employed on a crystal such as that shown in FIG. 3 using geometrical deflection. In FIG. 4 a reflective coating 31 is placed on a "bent" face of a material having ferroelastic properties such as gadolinium molybdate.

Light incident on the crystal parallel to the optic axis but passing through a single domain such as ray 32 passing through domain 33 is deflected by the angle $\alpha$. Rays parallel to the optic axis but entering one domain, traversing the domain wall and the second domain such as ray 34 entering domain 35 and exiting domain 33, are deflected by an angle $\alpha N$. The difference for the two rays is $$\alpha(N-1)$$

as for the arrangement shown in FIG. 3 and likewise the width of the area reflecting light at angle $\alpha N$ is $$\alpha t(N-1)/N$$

as in FIG. 3.

Figure 5:
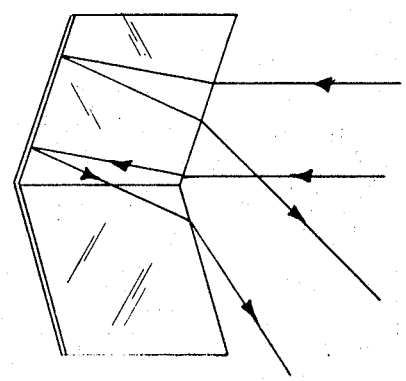
FIG. 5 illustrates the deflection of light when the crystal of FIG. 3 is equipped with a reflecting surface on its convex side.

FIG. 5 illustrates another possible configuration which is not, however, preferred. Although the deflection angles are the same as in FIG. 4 the width of the deflecting source due to geometric considerations is a second order effect given by $$W = \alpha^2 t/N$$

The above methods of deflecting light in the vicinity of the domain wall, and particularly those of FIG. 2 and FIG. 3, can be used inside a laser optical cavity to obtain optical scanners which are not mode selective and which have a relatively high optical output.

Figure 6:
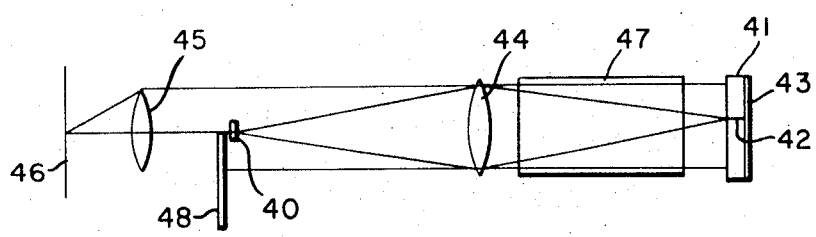
FIG. 6 is a diagram showing one embodiment of this invention using the properties of a domain wall to extract a scannable image from a laser cavity.

FIG. 6 shows one configuration which can be employed in the present invention. In FIG. 6 an optical resonant cavity is formed by a small surface coated mirror 40 at one end and by a c-cut gadolinium molybdate crystal 41 at the other end having the (001) faces perpendicular to the optic axis of the cavity; and the (001) face external to the cavity coated with a gold coating 43. The gadolinium molybdate crystal 41 is divided into two domains by a domain wall 42 and means are provided to drive the domain wall back and forth across the crystal plate, which are described hereinafter. A lens 44 having a focal length one-half the length of the cavity is placed at the center of the cavity between mirror 40 and reflective coating 41. The lasing medium 47 is placed between lens 44 and the gadolinium molybdate crystal 41. In view of the reflective losses at the reflecting surfaces in the cavity the lasing medium 45 should have relatively high gain. A mercury ion lasing medium such as a hollow cathode discharge is suitable. The coherent light between lens 44 and plane mirror 43 is collimated when it passes through the domains of the gadolinium molybdate crystal 41 separated by domain wall 42. The lens 44 brings this coherent light to focus at the small mirror 40 which is placed at the focal distance from lens 44. Light traversing crystal 41 in the vicinity of the domain wall 42 exits in a divergent manner and is collimated by lens 44 so that, apart from a small amount of vignetting by mirror 40, the light is extracted from the laser cavity. The light thus extracted is imaged by lens 45 to a line image on the object plane 46, the degree of magnification depending on the relative focal lengths of lens 45 and lens 44.

The image obtained is a double line. Insertion of a half-place stop 48 in the Fourier transform plane converts the image to a single line which can be moved by moving the domain wall.

Figure 7:
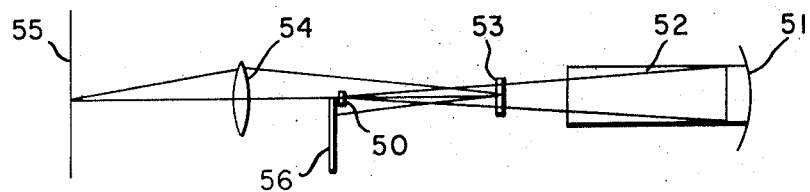
FIG. 7 is a diagram illustrating an alternate optical cavity to the laser of FIG. 6.

FIG. 7 shows an alternate optical system in which the resonant cavity is formed by a small mirror 50 and a concave mirror 51. The lasing medium 52 and the gadolinium molybdate crystal 53 can be placed at any convenient location in the cavity. Light from the domain wall region is imaged by lens 54 onto the image plane 55. Again a half-plane stop 56 is employed to obtain a single line image.

Figure 8:
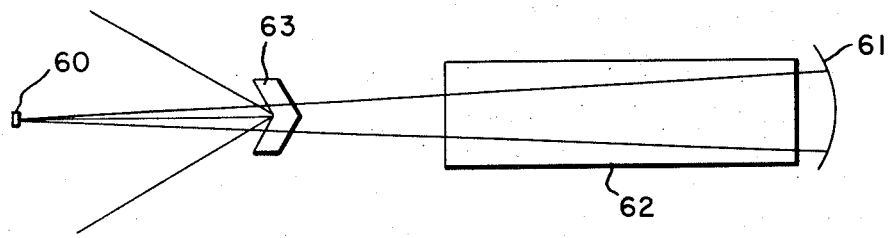
FIG. 8 is a diagram illustrating the use of geometric deflection of light by a ferroelectric material to extract a scannable line image from a laser cavity.

In FIG. 6 and FIG. 7 the domain wall is employed as a phase boundary and a scattering object in the laser cavity. Geometric deflection can also be employed as shown in FIG. 8 which is essentially the same as FIG. 7 except that the light is incident on the (110) face of a gadolinium molybdate crystal intersected by a domain wall and the extraction of light is assisted by the geometry of the crystal. In FIG. 8 the cavity is formed between mirrors 60 and 61, the lasing medium is indicated by 62 and the gadolinium molybdate crystal is indicated by 63.

To provide a line scanner it is necessary to provide means to move the domain wall in the above described devices. With coupled ferroelectric-ferroelastic materials such as gadolinium molybdate, this can be achieved by providing electrodes on the two opposing (001) faces of the crystal, i.e., on faces intersecting the ferroelectric axis, and applying an electric field to the electrodes. In some instances, such as when the gadolinium molybdate is employed with the (001) faces perpendicular to the optic axis of the cavity, the light within the cavity must pass through the electrodes. Accordingly, transparent electrodes such as tin oxide or indium oxide should be employed. In other applications, opaque electrodes such as sputtered metal electrodes can be employed. An example is when a gadolinium molybdate crystal is employed with the (110) faces intersected by the domain wall approximately perpendicular to the axis of the optical cavity.

Figure 9A:
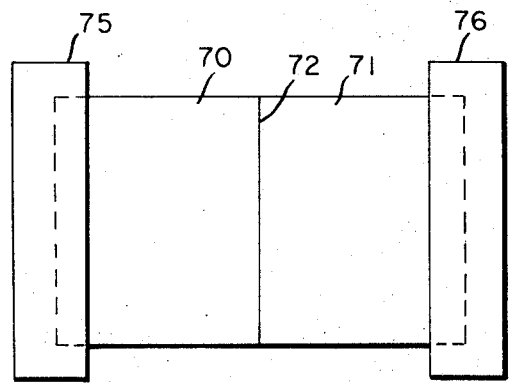
FIG. 9a shows a method of moving the domain wall of a ferroelastic crystal by an electrical field.
Figure 9B:
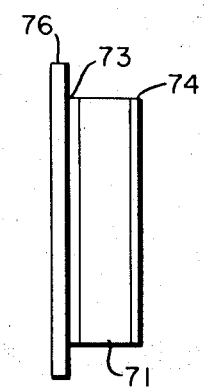

In practical applications, it is desirable to maintain a single domain wall trapped within a switching region of the crystal which region should be as large as the aperture of the system. FIGS. 9a and 9b illustrate a method of electroding a ferroelectric-ferroelastic crystal and of applying clamps to retain a domain wall within a predetermined region. In FIG. 9a is shown a c-cut gadolinium molybdate crystal with edges cut parallel to the {110} 09 set of planes divided into domains 70 and 71 by a domain wall 72. As described hereinabove, the crystal is "bent" at the domain wall. The crystal is electroded with electrically conducting and, if required, transparent electrodes 73 and 74 on the (001) faces thereof as shown in FIG. 9b which shows a side view of the assembly. Plates 75, 76 of a rigid material such as glass are cemented to the crystal. The plates have straight edges aligned parallel to the domain wall 72. A liquid, hardenable, cement which does not shrink on hardening should be employed to cement the assembly together. α-Cyanoacrylate cements are suitable for this purpose. Preferably the clamps are placed on the crystal and carefully aligned with the edges parallel to the preexisting domain wall and then the liquid cement is allowed to flow between each clamp and the crystal by capilliary attraction. The cement is then hardened.

To prevent chipping or spalling at the edges it is desirable to polish the sides of the plate and to round the edges thereof slightly by lapping after the electrodes have been applied.

The use of mechanical stress in addition to electrical stress offers advantages. Electrical stress is applied parallel to the polarization axis and can favor the formation of more than one domain wall direction. By contrast, mechanical stress can be directed to favor only a single domain wall orientation, and thus acts not only to drive the domain walls but to inhibit the formation of domain walls having undesired orientation. The degree of electrical stress, that is the applied electric field, is limited by the electrical breakdown of the crystal plate, and also of the media surrounding the plate (in most cases air).

With materials having ferroelectric as well as ferroelastic properties, it is necessary to transfer charge from one surface of the plate to the other. Accordingly, in such cases mechanical switching should be employed with electroded crystals and means to transfer charge between the electrodes.

The simplest means to transfer charge is to short-circuit the electrodes. In that event, the movement of the domain wall in the switching region is determined by the mechanical stress applied. For a given mechanical pressure, the rate of movement of the domain wall decreases with increasing electrical resistance between the electroded faces. Accordingly, switched fixed resistors or a variable resistor between the electrodes can be employed to control the rate of wall travel.

Instead of passive circuitry between the electrodes as described hereinabove, it is also possible to use elements such as constant or variable voltage sources to add to, or substract from effects of the mechanical stress.

Figure 10:
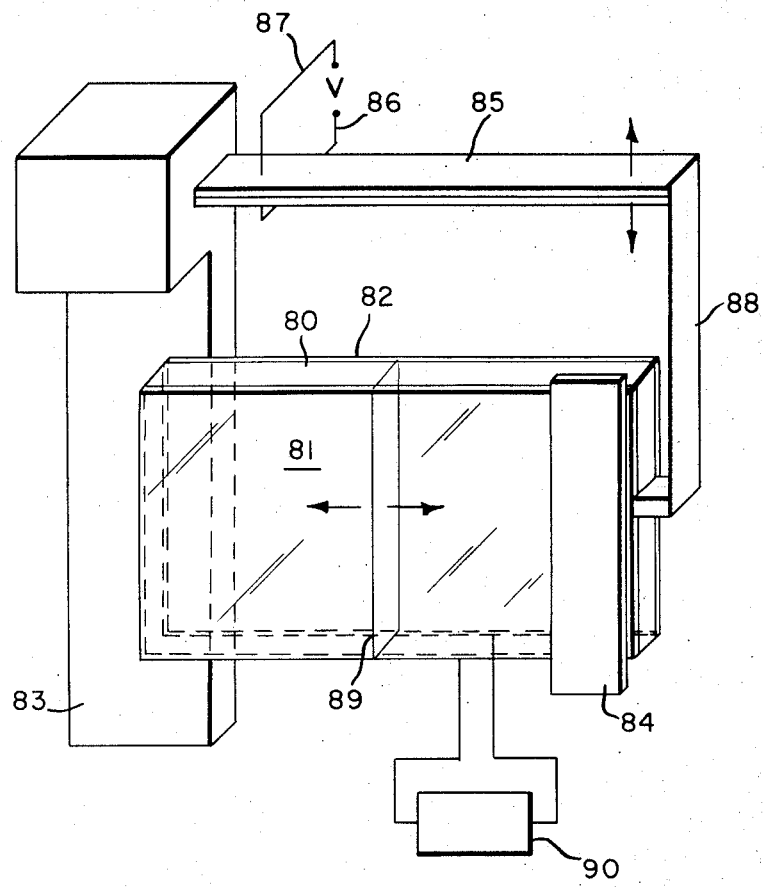
FIG. 10 shows a method of moving the domain wall of a ferroelastic material using mechanical stress.

FIG. 10 illustrates means to drive a domain wall in a material having ferroelastic properties. A crystal such as a c-cut crystal of gadolinium molybdate 80, which is fully electroded with electrodes 81, 82 on the faces of the plate is cemented to a supporting clamp 83 and a movable clamp 84. The clamps are so applied that the switching region contains a single domain wall parallel to the straight edges of the clamps. The mechanical stress is supplied by a bender bimorph element 85 composed of two piezoelectric ceramic strips, which are oriented, electroded and joined together. Such devices are well known as mechanical-electrical transducers, e.g., in ceramic phonograph cartridges. On application of a voltage V across leads 86 and 87 attached to the electrodes faces of the bender bimorph, the element bends. Generally, a voltage of 100–200 v. is sufficient to drive the device which is capable of high frequency response. The end of the bender bimorph 85 opposite the supporting clamp 83 is attached to a drive rod 88. The other end of rod 88 is cemented with epoxy cement to the edge of the crystal plate 80. Thus on application of a voltage V force is applied to the crystal plate directed parallel to the domain wall 89. Active or passive means 90 to control the flow of charge between electrodes 81 and 82, as described hereinabove are provided as described hereinabove.

The method of mechanical driving can be applied to pure ferroelastic materials, i.e., crystalline materials which exhibit ferroelasticity but not ferroelectricity.

Recently, it has been discovered that lead phosphate is a pure ferroelastic material which has suitable optical properties for use in the present invention.

The structure of the paraelastic and ferroelastic phases of $\alpha$-lead phosphate has been investigated by Keppler, Z. fur Krist. 132 228–235 (1970) who found the high temperature form had symmetry $\bar{3}m$ above the transition temperature of 170°C with unit cell dimension $c = 20.30 \pm 0.05A$, and $a = 5.53 \pm 0.02$ for the hexagonal unit cell. Below 179°C the material is monoclinic with space group 2/m and unit cell dimensions at 25°C of $a = 13.816 \pm 0.035A$, $b = 5.692 \pm 0.015A$, $c = 9.429 \pm 0.024A$ and $\beta = 102.36° \pm 0.05°C$. The material is thus classified as $\bar{3}mF2/m$ in the Aizu notation and three types of domains should exist corresponding to the strain transforming the trigonal to the monoclinic form occurring in one of the three equivalent mirror planes of the trigonal phase. Each pair of domains can interface at one or the other of two mutually perpendicular walls and thus a total of six wall orientations are possible.

$\alpha$-Lead phosphate is transparent from $5\mu$ to $0.28\mu$, i.e., the whole visible spectrum. The crystals cleave readily along the $b$–$c$ plane corresponding to the $c$-plane of the hexagonal unit cell. The domains are biaxially birefringent with $\Delta\mu = 7 \times 10^{-5}$ (optically negative). The optic axes lie in the a-c mirror plane of the monoclinic unit cell. The high temperature form is uniaxially birefringent and isotropic along the $c$ axis.

The six domain walls can be classified into two sets, one set of 3 n-walls and one set of 3 t-walls. The $n$ walls are essentially perpendicular to the $b$–$c$ plane of cleavage and lie at 60° to the $a$–$c$ mirror plane and hence to the plane of the optic axis. The crystals "bend" in the $b$–$c$ plane by an angle of 1.6° at an n wall, and a spontaneous bend of about 4.4° in the plane perpendicular to the wall is also found. The $t$ walls lie at 30° to the $a$–$c$ mirror plane and tilted at an angle of approximately 73° to the $b$–$c$ plane. The bend in planes normally perpendicular to the wall is about 4.6°, but no bending in the $b$–$c$ plane is observed.

Either an $n$ wall or a $t$ wall can be employed in the practice of the present invention. The $n$ walls behave as described hereinabove for the domain walls of gadolinium molybdate. The t walls can be employed with the $b$–$c$ plane of the crystal perpendicular to the optic axis of the laser cavity. In that event the width of the line obtainable depends on the thickness of the crystal.

Both $n$ walls and $t$ walls can be moved in a plate using mechanical drive as shown in FIG. 10, except that, since $\alpha$-lead phosphate is a pure ferroelastic, the electrodes, and means to transfer charge between the electrodes, are removed.

Since the number of possible domain walls are greater, there is a greater possibility for nucleating and propagating domain walls of unwanted orientation with lead phosphate. Clamping should be employed, as in FIG. 9 and FIG. 10 and great care should be taken to align the mechanical drive so that the stress is parallel to the desired domain wall.

Some difficulty may be encountered in obtaining $\alpha$-lead phosphate single crystals wherein the domain walls can be moved by simple mechanical pressure to obtain a sample with a single domain wall. In most cases a number of differing wall orientations are obtained which interlock. On application of stress the walls will not move and the crystal may shatter.

Such crystals can be brought to a state in which substantially all of the walls are in a single direction, and the crystal can thereafter be converted to the desired state where only a single domain wall is present by simple mechanical stress. This process can be termed "poling."

One method of poling crystals of lead phosphate is described in copending, commonly assigned patent application U.S. Ser. No. 301,540 filed Oct. 27, 1972. The method uses a hot stage having a uniform temperature gradient preferably not more than 10°C/cm. and having the isothermal at the Curie temperature near the center of the stage. The crystal plate is placed in the cool end of the stage then manipulated so that only a region containing domain walls of selected orientation remains below the Curie temperature, the domain walls running at a substantial angle, greater than 45°, to the Curie point isothermal. The crystal is then cooled either by reducing current to the hot stage or by moving the crystal so that the Curie point isothermal sweeps through the crystal in a direction perpendicular to its length. The domain walls extend behind the Curie point isothermal to cover the crystal. The domain walls can then be removed in whole or in part by mechanical stress.

Another method of poling a ferroelastic crystal is to apply stress directed along a selected domain wall direction while cooling the crystal through the Curie temperature. A relatively small stress is tried at first and the process repeated with increased stress if needed. The domain walls present bear the same orientation and can be removed by stress as above.

The laser scanner of the present invention is not mode selective, i.e., all modes of the laser are utilized. Further the scanner only extracts light from the laser cavity which forms the desired image. The device is, therefore, more efficient than scanners, utilizing a ferroelastic crystal external to the cavity wherein the light passing through the domains is eliminated by polarization or spatial filtering, as shown in U.S. Pat. Nos. 3,701,585 and 3,704,937.

Since obvious modifications and equivalents in the invention will be evident to those skilled in the arts, I propose to be bound solely by the appended claims.

The specific embodiments of the invention in which an exclusive property or privilege is claimed are defined as follows:

1. An intracavity laser scanner comprising an optical resonant cavity,
   a lasing material in said cavity,
   a single crystal of a transparent crystalline material having ferroelastic properties, said crystal being divided into domains by at least one domain wall and disposed in said cavity so that the plane of said domain wall is substantially parallel to the light resonant in said cavity whereby light passing only solely through the domain of said crystal is undeflected in the optical path of said cavity while light passing the region of said domain wall is deflected from the optical path in said cavity;
   means to move said domain wall in said crystal; and
   means to image the light deflected by said domain walls.

2. The device of claim 1 wherein said crystal is a crystal of a rare earth molybdate having the $\beta'$-gadolinium molybdate structure.

3. The device of claim 2 wherein said crystal is a plate oriented with its $c$ axis along the axis of said optical cavity.

4. The device of claim 2 wherein said crystal is a plate having its faces cut parallel to (110) faces intersected by a domain wall, said faces being perpendicular to the optic axis of said cavity.

5. The device of claim 1 wherein said crystal is a crystal of $\alpha$-lead phosphate cut to a plate on the $b$–$c$ plane.

6. The device of claim 5 wherein said domain wall is an $n$-wall.

7. The device of claim 5 wherein said domain wall is a $t$-wall.

* * * * *